US011190281B2

(12) United States Patent
Peitzer et al.

(10) Patent No.: US 11,190,281 B2
(45) Date of Patent: *Nov. 30, 2021

(54) METHOD AND APPARATUS FOR MITIGATING RADIO INTERFERENCE

(71) Applicants: AT&T Intellectual Property I, L.P., Atlanta, GA (US); AT&T Mobility II LLC, Atlanta, GA (US)

(72) Inventors: Haywood S. Peitzer, Randolph, NJ (US); James Gordon Beattie, Jr., Bergenfield, NJ (US); David Peitzer, Bedminster, NJ (US)

(73) Assignees: AT&T Intellectual Property I, L.P., Atlanta, CO (US); AT&T Mobility II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/798,570

(22) Filed: Feb. 24, 2020

(65) Prior Publication Data

US 2020/0195356 A1      Jun. 18, 2020

Related U.S. Application Data

(63) Continuation of application No. 16/106,199, filed on Aug. 21, 2018, now Pat. No. 10,615,886.

(51) Int. Cl.
*H04W 4/00* (2018.01)
*H04B 15/02* (2006.01)
(Continued)

(52) U.S. Cl.
CPC ........... *H04B 15/02* (2013.01); *H04B 17/345* (2015.01); *H04W 56/0035* (2013.01);
(Continued)

(58) Field of Classification Search
None
See application file for complete search history.

(56) References Cited

U.S. PATENT DOCUMENTS

| 7,551,546 B2 | 6/2009 | Ma et al. |
| 8,224,242 B2 | 7/2012 | Chang, II |

(Continued)

FOREIGN PATENT DOCUMENTS

| CN | 103580720 B | 7/2015 |
| GB | 2499259 A | 8/2013 |

(Continued)

OTHER PUBLICATIONS

Balatsoukas-Stimming, Alexios et al., "On Self-interference Suppression Methods for Low-complexity Full-duplex MIMO", Signals, Systems and Computers, 2013 Asilomar Conference, IEEE, 2013., 2013, 6 pages.

(Continued)

*Primary Examiner* — Clemence S Han
(74) *Attorney, Agent, or Firm* — Guntin & Gust, PLC; Dana Lemoine

(57) ABSTRACT

Aspects of the subject disclosure may include, for example, determining that interference associated with a signal exceeds a threshold, determining at least one operating parameter associated with a user equipment to modify responsive to the determining that the interference exceeds the threshold, wherein the at least one operating parameter includes a frequency band that the user equipment uses to communicate or a clock signal frequency range of a clock of the user equipment, and transmitting a notification to the user equipment, wherein the notification includes an indication of the at least one operating parameter. Other embodiments are disclosed.

20 Claims, 16 Drawing Sheets

(51) Int. Cl.
*H04W 72/08* (2009.01)
*H04W 72/04* (2009.01)
*H04B 17/345* (2015.01)
*H04W 56/00* (2009.01)

(52) U.S. Cl.
CPC ..... *H04W 72/0453* (2013.01); *H04W 72/082* (2013.01); *H04B 2215/065* (2013.01)

(56) References Cited

U.S. PATENT DOCUMENTS

| | | | |
|---|---|---|---|
| 8,594,000 B2 | 11/2013 | Johansson et al. | |
| 8,606,289 B2 | 12/2013 | Gaal | |
| 8,725,067 B2 | 5/2014 | Ahn et al. | |
| 8,798,546 B2 | 8/2014 | Banwell et al. | |
| 8,913,528 B2 | 12/2014 | Cheng et al. | |
| 8,953,476 B2 | 2/2015 | Zhao et al. | |
| 9,185,711 B2 | 11/2015 | Lin et al. | |
| 9,191,925 B2 | 11/2015 | Roessel et al. | |
| 9,391,680 B2 | 7/2016 | Le-ngoc et al. | |
| 9,503,134 B2 | 11/2016 | Sadek et al. | |
| 9,571,153 B2 | 2/2017 | Kim et al. | |
| 9,641,309 B2 | 5/2017 | Ko et al. | |
| 9,654,274 B2 | 5/2017 | Park et al. | |
| 9,860,052 B2 | 1/2018 | Mccoy et al. | |
| 9,912,464 B2 | 3/2018 | Jin et al. | |
| 2001/0011027 A1* | 8/2001 | Matsuura | G06F 1/08 455/557 |
| 2002/0137465 A1* | 9/2002 | Nakano | H04B 15/04 455/62 |
| 2002/0142724 A1* | 10/2002 | Nakano | H04B 15/04 455/62 |
| 2003/0100280 A1* | 5/2003 | Kusbel | H04B 15/04 455/182.1 |
| 2004/0203453 A1* | 10/2004 | Vaananen | H04B 15/02 455/67.11 |
| 2007/0009067 A1* | 1/2007 | Michalak | H04B 15/02 375/346 |
| 2007/0014556 A1* | 1/2007 | Persson | H04B 1/3833 396/57 |
| 2008/0112517 A1 | 5/2008 | Parts et al. | |
| 2009/0080583 A1* | 3/2009 | Skinner | H04B 15/02 375/371 |
| 2009/0111525 A1* | 4/2009 | Hwang | H04W 72/02 455/561 |
| 2009/0154615 A1* | 6/2009 | Hijikata | H04N 21/4382 375/344 |
| 2010/0137025 A1* | 6/2010 | Tai | H04B 3/32 455/553.1 |
| 2010/0283665 A1 | 11/2010 | Bashir et al. | |
| 2011/0026422 A1* | 2/2011 | Ma | H04L 5/0053 370/252 |
| 2011/0034132 A1* | 2/2011 | Babitch | H04B 15/02 455/76 |
| 2011/0075721 A1* | 3/2011 | Minakawa | H04B 15/02 375/238 |
| 2011/0096864 A1* | 4/2011 | Yu | H04B 1/10 375/295 |
| 2011/0115537 A1* | 5/2011 | May | H04B 15/04 327/170 |
| 2011/0151819 A1* | 6/2011 | Dickey | H03J 3/02 455/310 |
| 2012/0128107 A1* | 5/2012 | Oren | H04B 15/06 375/344 |
| 2012/0218017 A1* | 8/2012 | Roy | H04B 1/1027 327/172 |
| 2012/0250745 A1* | 10/2012 | Lockerbie | G06F 1/1656 375/222 |
| 2013/0229994 A1* | 9/2013 | Kim | H04W 72/082 370/329 |
| 2014/0177609 A1* | 6/2014 | Vandenameele | H04W 56/00 370/336 |
| 2014/0218352 A1* | 8/2014 | Zhao | G09G 5/18 345/214 |
| 2015/0093994 A1* | 4/2015 | Skinner | H04W 52/241 455/63.1 |
| 2016/0232938 A1* | 8/2016 | Cottinet | H04B 15/04 |
| 2017/0019239 A1 | 1/2017 | Jin et al. | |
| 2017/0041086 A1* | 2/2017 | Park | H04B 15/02 |
| 2017/0111155 A1 | 4/2017 | Liu et al. | |

FOREIGN PATENT DOCUMENTS

| | | |
|---|---|---|
| JP | 2004349872 A | 12/2004 |
| WO | 2004107596 A1 | 12/2004 |
| WO | 2012115330 A1 | 8/2012 |
| WO | 2017063696 A1 | 4/2017 |

OTHER PUBLICATIONS

Everett, Evan et al., "Passive Self-Interference Suppression for Full-Duplex Infrastructure Nodes", IEEE Transactions on Wireless Communications 13.2 (2014): 680-694., Dec. 17, 2013, 16 pages.

Fifer, William C. et al., "The Low-Cost Packet Radio", Proceedings of the IEEE 75.1 (1987): 33-42. ,Jan. 1987, 12 pages.

Hong, Steven et al., "Applications of Self-Interference Cancellation in 5G and Beyond", IEEE Communications Magazine (2014): 115., 2014, 8 pages.

Karn, Phil, "A New Channel Access Method for Packet Radio", ARRL/CRRL Amateur radio 9th computer networking conference, vol. 140, 1990.,1990, 7 pages.

Yang, Binqi et al., "An RF Self-interference Cancellation Circuit for the Full-duplex Wireless Communications", Antennas Propagation (ISAP), 2013 Proceedings of the International Symposium, vol. 2, IEEE, 2013., 2013, 4 pages.

\* cited by examiner

METHOD AND APPARATUS FOR MITIGATING RADIO INTERFERENCE

CROSS REFERENCE TO RELATED APPLICATIONS

This application is a continuation of U.S. patent application Ser. No. 16/106,199 filed on Aug. 21, 2018. All sections of the aforementioned application are incorporated herein by reference in their entirety.

FIELD OF THE DISCLOSURE

The subject disclosure generally relates to a management of interference and more specifically to interference associated with a clock frequency.

BACKGROUND

In many communication environments, interference may be created when a processor or processor core is operating at a clock frequency that corresponds to a frequency associated with a communication channel/band. In addition to interference associated with the operating, fundamental frequency, harmonics or sub-harmonics of the fundamental frequency may contribute interference. Interference can impact the performance of a communication system leading to lower throughput, dropped calls, reduced bandwidth which can cause traffic congestion, or other adverse effects, which are undesirable.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for reducing or avoiding interference. Other embodiments are described in the subject disclosure.

One or more aspects of the subject disclosure include a selection or adjustment/modification of a clock signal (in terms of an operating frequency or frequency range).

One or more aspects of the subject disclosure include a selection or adjustment/modification of a frequency or frequency band used by a device in communicating, e.g., information/data or signals.

Figure 1:
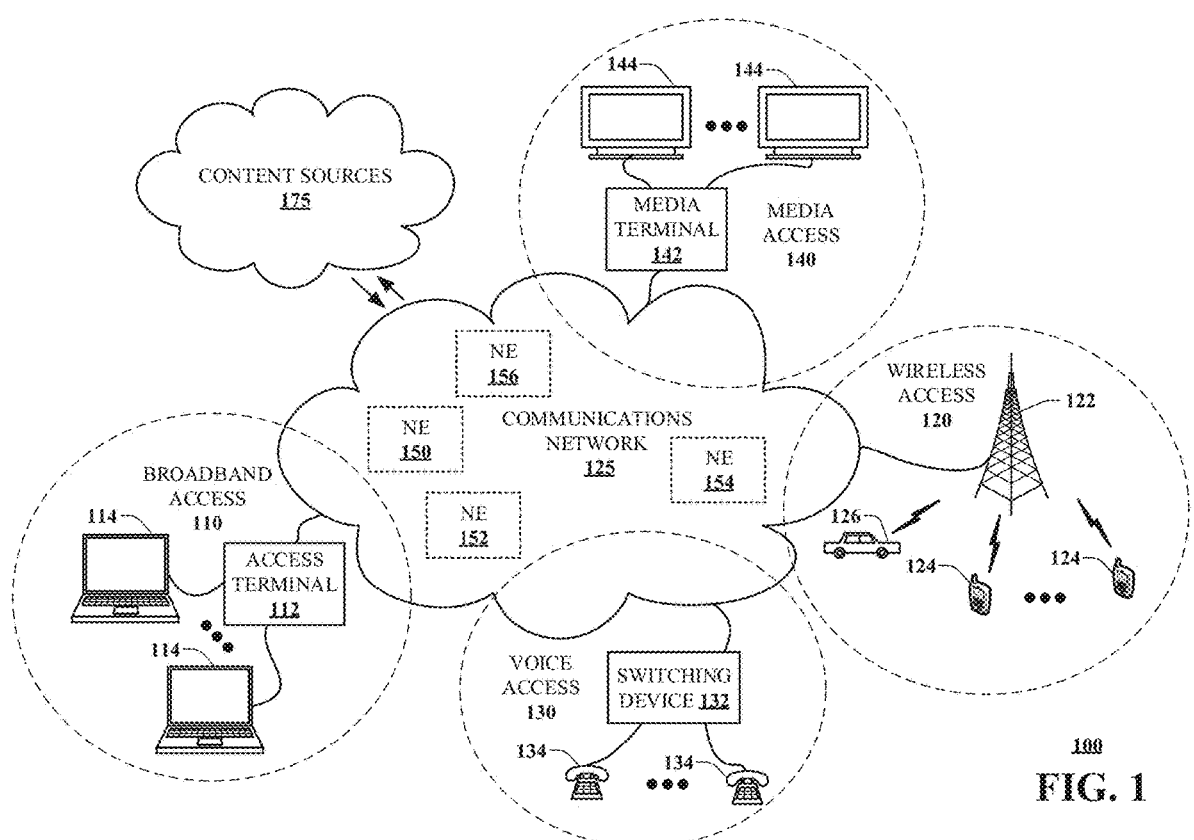
FIG. 1 is a block diagram illustrating an example, non-limiting embodiment of a communications network in accordance with various aspects described herein.

Referring now to FIG. 1, a block diagram is shown illustrating an example, non-limiting embodiment of a communications network 100 in accordance with various aspects described herein. In some embodiments, the communications network 100 may provide interference mitigation, such as for example interference mitigation in connection with wireless communications involving user equipment. Interference may have a tendency to occur (and may actually occur) due to self/intra-device interference and/or inter-device interference resulting from communications/signaling involving more than one device. The interference may be mitigated or otherwise avoided by controlling/regulating communication frequency bands and/or clock signal frequencies associated with one or more devices.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
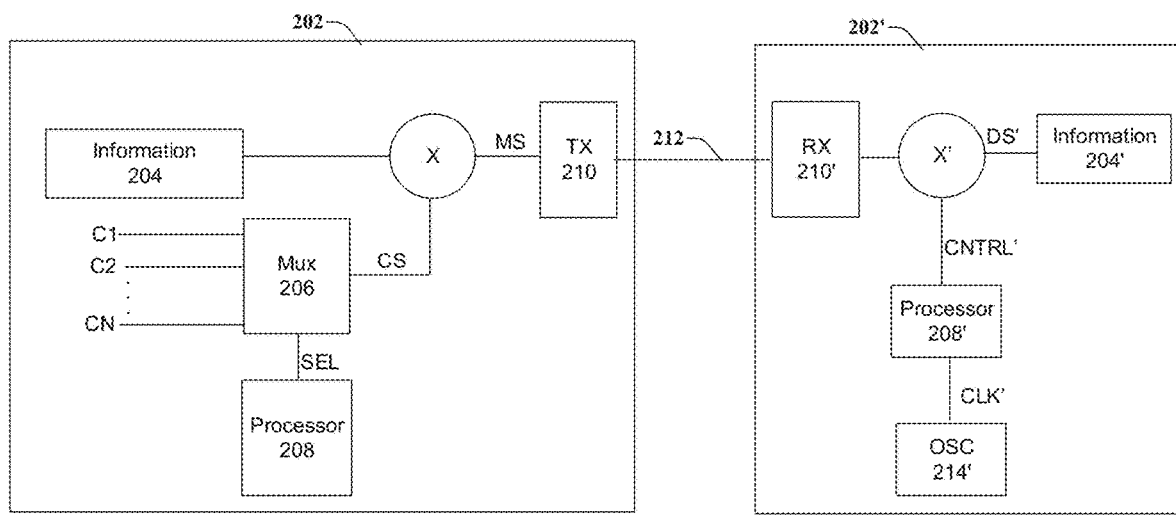
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. In particular, the system 200 may include a first device 202 and a second device 202'.

The devices 202 and 202' may correspond to one or more of the devices/entities shown in one or more of the other figures included herewith. For example, in an illustrative embodiment the device 202 may correspond to a network element (e.g., NE 150—see FIG. 1) or a base station or access point 122 (see FIG. 1). The device 202' may correspond to a user equipment (UE), such as for example a mobile device 124 (see FIG. 1). In some embodiments, the device 202 may correspond to a UE and the device 202' may correspond to, e.g., a network element. In some embodiments, the device 202 and the device 202' may both correspond to UEs, and may be included as part of a peer-to-peer network. In some embodiments, the device 202 and the device 202' may both correspond to, e.g., network elements.

The devices 202 and 202' may be communicatively coupled to one another via a communication link 212. The communication link 212 may correspond to a wireless communication link or a wired communication link. The device 202 may transmit a signal to the device 202' via the communication link 212. The device 202' may receive the transmitted signal via the communication link 212.

In some embodiments, the system 200 may be used to transfer information from the device 202 to the device 202'. For example, information 204 that is available to (e.g., stored on or accessed by) the device 202 that is transferred to the device 202' may include, without limitation, audio information, video information, graphics information, text information, control/configuration information, etc.

A carrier signal/wave CS may be modulated with another/second signal corresponding to the information 204 (in block X) to generate a modulated signal MS. The modulated signal MS may be provided to a transmitter (TX) 210. The TX 210 may transmit the modulated signal MS to the device 202' via the communication link 212.

The modulated signal MS conveyed via the communication link 212 may be received by a receiver (RX) 210' of the device 202'. Based on one or more control (CNTRL') signals provided by a processor 208', the modulated signal MS may be demodulated (in block X') to generate a demodulated signal DS'. The demodulated signal DS' may correspond to, or include, information 204'.

The processor 208' may be operative on the basis of a clock (CLK') signal. An oscillator (OSC) 214' may generate the CLK' signal and provide the CLK' signal to the processor 208'.

Ideally, the information 204' corresponds to the information 204. However, as one skilled in the art would appreciate, the information 204' (or an associated signal) may differ from the information 204 (or an associated signal) due to non-idealities that may be present in the system 200. For example, interference that is present in the system 200 may contribute to, e.g., an absence of data in the information 204', where that data is present in the information 204. In some embodiments, the interference that is present in the system 200 may contribute to, e.g., an introduction of data in the information 204', where data is absent from the information 204. In some embodiments, the interference may effect signal strength and may require error correction in the communications. In some embodiments, such correction may include re-transmitting signals/information, which can lead to network congestion.

In some instances, the interference that is present in the system 200 may be caused by a coupling between, e.g., the frequency of the modulated signal MS and the frequency of the CLK' signal. For example, if the modulated signal MS is operative within a frequency band centered at (approximately) 2.355 GHz, and if the CLK' signal output by the OSC 214' is operative within a frequency range between 1.8 GHz and 2.6 GHz (which can be common for many types of user equipment), then local/intra-device interference may be generated at the device 202' due to the correspondence/overlap between the frequencies of the modulated signal MS and the CLK' signal. Still further, even if there is no overlap at the operative/fundamental frequencies, harmonics or sub-harmonics of one or both of the modulated signal MS or the CLK' signal may result in a generation of interference at the device 202'.

Aspects of the disclosure may be applied in connection with frequency bands coinciding with, e.g., a center frequency of 2.4 GHz or 5.7 GHz; such bands are frequently used in connection with wireless LANs, Bluetooth® communications, Wi-Fi communications, cordless phones, and other applications. Furthermore, harmonics or sub-harmonics associated with any of the foregoing frequencies may cause interference in relation to 700 MHz and 850 MHz bands frequently used in connection with LTE communications.

The above-mentioned frequencies are illustrative. Aspects of the disclosure may be applied in connection with any number of frequencies or frequency bands or any clock signals that create interference with communications.

The amount of interference that is tolerable within the system 200 may be a function of one or more requirements, such as for example one or more quality of service (QoS) requirements associated with the system 200. In some embodiments, the amount of interference that is tolerable may be based on the signal levels that are used. For example, if the signal that is transmitted on the communication link 212 is less than a first threshold in terms of, e.g., power, all other things being equal less interference may be tolerated than if the signal power was greater than the first threshold. Still further, if the CLK' signal that is provided to the processor 208' is less than a second threshold in terms of, e.g., voltage amplitude, all other things being equal less interference may be tolerated than if the CLK' signal voltage amplitude was greater than the second threshold.

In view of the foregoing, if the interference is greater than a threshold (in terms of one or more parameters or metrics), steps may be taken to reduce, or even completely eliminate, the interference. For example, if the modulated signal MS and the CLK' signal overlap in terms of frequency, a frequency associated with the modulated signal MS may be adjusted to avoid the overlap. For example, the carrier signal CS may be selected from one of a plurality of candidate carrier signals C1, C2, . . . CN, where N represents the number of candidate carrier signals that may be present/used.

In FIG. 2A, a multiplexer (MUX) 206 is shown, where the MUX 206 outputs the carrier signal CS as a selection of one of the input candidate carrier signals C1 through CN. The particular candidate carrier signal C1 through CN that is selected by the MUX 206 may be based on selection (SEL) control signals provided by a processor 208. The candidate carrier signals C1 through CN may differ from one another in terms of frequency, such that a selection of a particular one of the candidate carrier signals C1 through CN may result in different frequencies or frequency bands of the modulated signal MS for the same information 204. In this manner, the frequency band in which the modulated signal MS operates may be controlled/selected based on the particular candidate carrier signal C1 through CN that is selected.

Figure 2B:
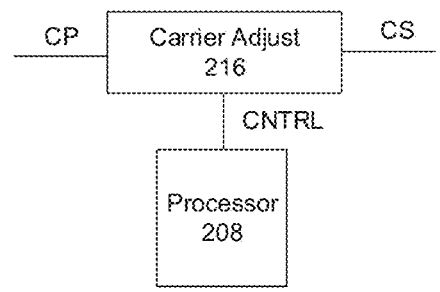
FIG. 2B is a block diagram illustrating a selection/adjustment of a carrier signal in accordance with various aspects described herein.

FIG. 2B illustrates an exemplary embodiment wherein the carrier signal CS is generated as an output of a carrier adjustment 216. For example, the carrier adjustment 216 may receive a pre-carrier signal CP as an input and adjust the pre-carrier signal CP (based on one or more control (CNTRL) signals provided by the processor 208) to generate the carrier signal CS. As one skilled in the art will appreciate based on a review of this disclosure, the carrier adjustment 216 may be implemented in hardware, firmware, as a software algorithm, or any combination thereof.

The carrier adjustment 216 may decrease the frequency of the pre-carrier signal CP in generating the carrier signal CS. For example, the carrier adjustment 216 may divide the pre-carrier signal CP in generating the carrier signal CS. In some embodiments, the carrier adjustment 216 may increase the frequency of the pre-carrier signal CP in generating the carrier signal CS. For example, the carrier adjustment 216 may multiply the frequency of the pre-carrier signal CP in generating the carrier signal CS. In some embodiments, the carrier adjustment 216 may simply pass the pre-carrier signal CP as an output carrier signal CS (e.g., multiplication or division by a factor of one).

The generation of the carrier signal CS in FIG. 2B may provide additional flexibility relative to the use of the MUX 206 shown in FIG. 2A. For example, the carrier adjustment 216 may be used to generate a carrier signal CS with a frequency that may be selected from more than N frequencies or frequency bands. Additionally, the configuration of FIG. 2B avoids having to have all N candidate carriers signals present in the first instance. If the device 202 is sensitive to signal interference, is operating on a limited power supply (e.g., battery power), etc., a reduction in the number of signals that are present in the device 202 at any given time may be desirable/warranted.

Figure 2C:
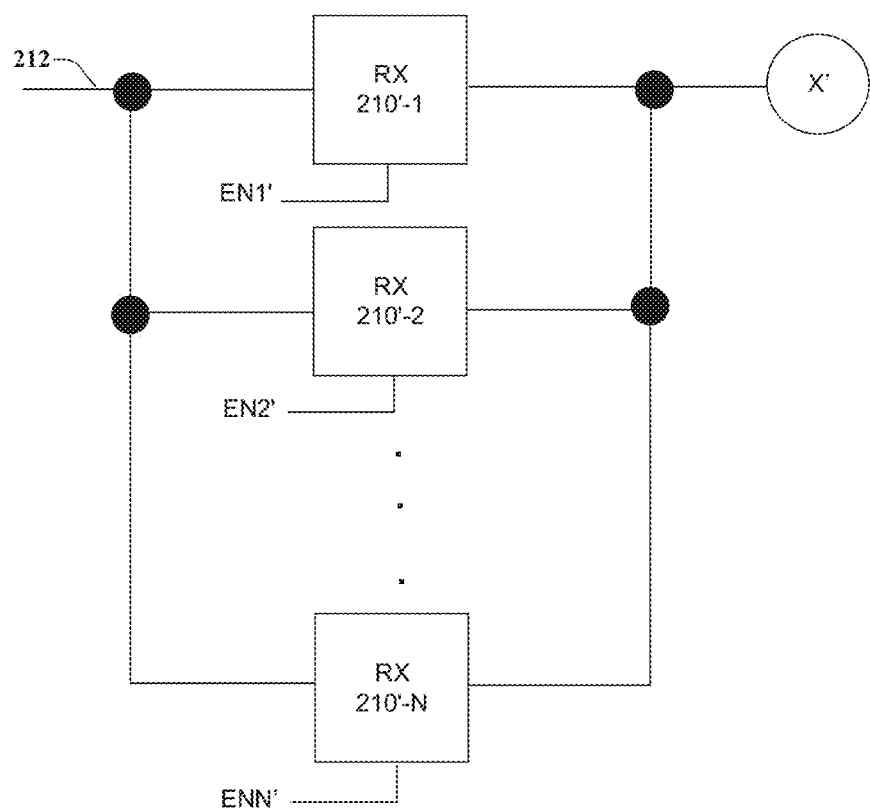
FIG. 2C is a block diagram illustrating a reception of a signal transmitted over a communication link via a plurality of receivers that are selectively enabled in accordance with various aspects described herein.

Having just described a selection of a frequency (or frequency band) in conjunction with the device 202 (e.g., on the transmission side of the communication link 212), the device 202' (e.g., on the receiving side of the communication link 212) may be configured to match the parameters selected for the device 202. For example, assuming the system architecture for the device 202 corresponds to that shown in FIG. 2A (e.g., where the MUX 206 is used), FIG. 2C illustrates the receiver RX 210' having been split-up into a plurality of receivers RXs 210'-1, 210'-2 . . . 210'-N. Each of the RXs 210'-1 through 210'-N may be configured to accept/pass a modulated signal MS over the communication link 212 with a frequency that coincides with a particular frequency band (while rejecting signals that are outside of that frequency band). For example, receiver RX 210'-1 may be configured to (only) accept/pass signals that coincide with the use of candidate carrier C1, receiver RX 210'-2 may be configured to (only) accept/pass signals that coincide with the use of candidate carrier C2, and receiver RX 210'-3 may be configured to (only) accept/pass signals that coincide with the use of candidate carrier CN.

Each of the receivers RX 210'-1 through RX 210'-N may be connected to the demodulating block/circuit X' via, e.g., a bus architecture. The receivers RX 210'-1 through RX 210'-N may be selectively enabled or powered-on based on a respective enable signal (e.g., EN1', EN2', . . . ENN') that may be provided by the processor 208' (see FIG. 2A).

Figure 2D:
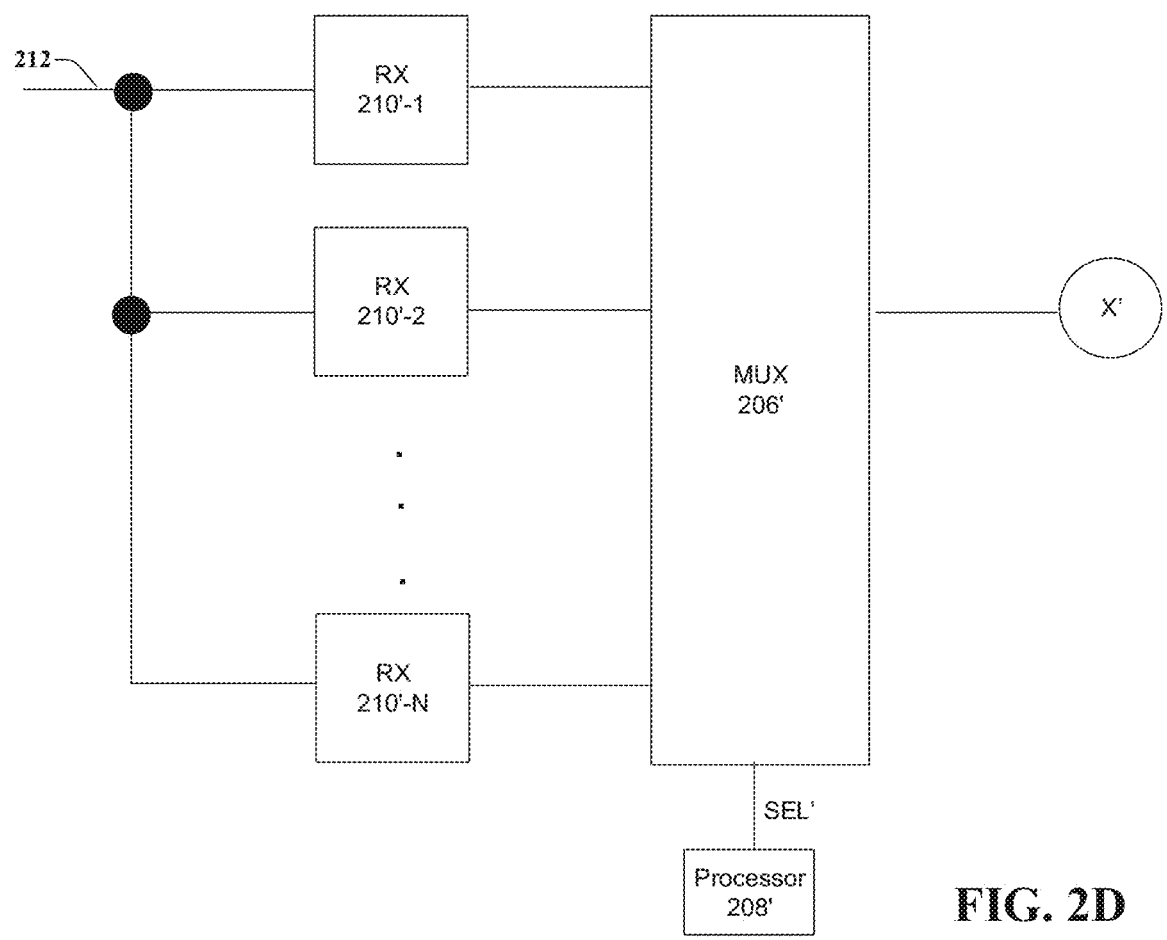
FIG. 2D is a block diagram illustrating a reception of a signal transmitted over a communication link via a plurality of receivers and a multiplexer in accordance with various aspects described herein.

In some embodiments, in lieu of selectively enabling or powering-on the receivers RX 210'-1 through 210'-N, a multiplexer (MUX) may be used. For example, FIG. 2D illustrates the outputs of the receivers 210'-1 through 210'-N being provided as input to a MUX 206'. The output of the MUX 206' may be provided to the demodulating block X'. The output of the MUX 206' may be selected based on control/selection SEL' signals provided by the processor 208'. The SEL' signals may be based on the particular frequency or frequency band of the modulated signal MS that is used (which, in turn, may be based on the particular frequency or frequency band associated with a carrier signal CS that is used).

Figure 2E:
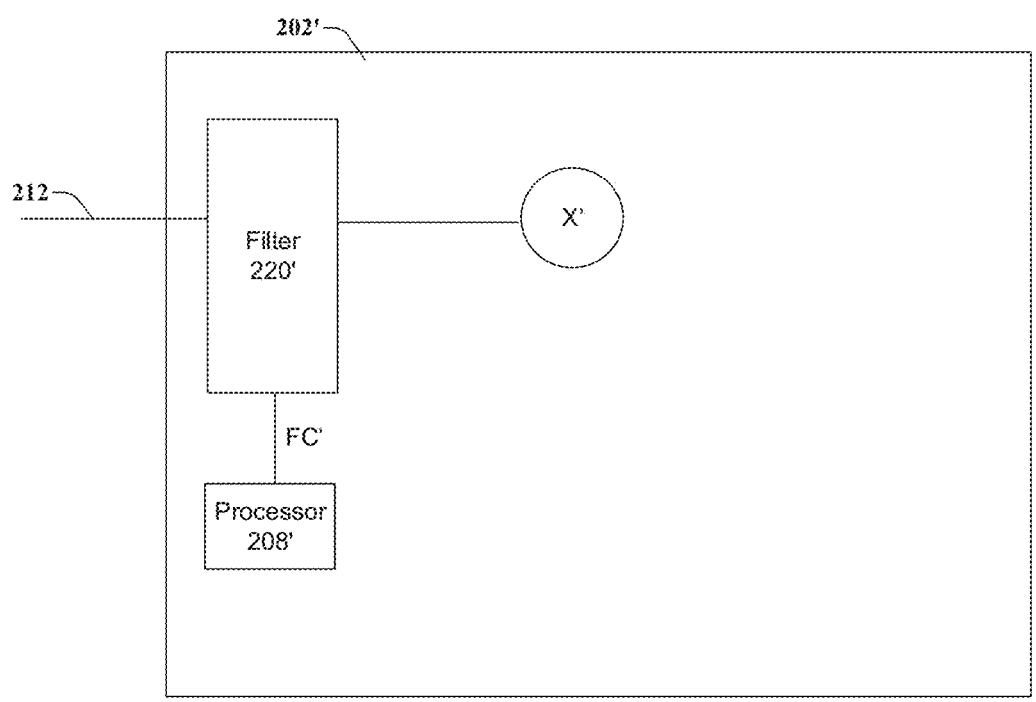
FIG. 2E is a block diagram illustrating a device that receives a signal via a communication link using a filter in accordance with various aspects described herein.

Referring to FIG. 2E, an embodiment is shown where a filter 220' is included. The filter 220' may be included as part of the RX 210 of FIG. 2A. The operation of the filter 220' may be controlled via one or more filter control (FC') signals. The filter control FC' signals may be based on the particular frequency or frequency band of the modulated signal MS that is used (which, in turn, may be based on the particular frequency or frequency band associated with a carrier signal CS that is used).

The architecture of FIG. 2E may provide additional flexibility beyond that provided via the architectures of FIGS. 2C-2D. For example, the architecture of FIG. 2E may enable more than N frequencies or frequency bands to be accommodated. The architectures of FIGS. 2C-2D may be less complex than the architecture of FIG. 2E; as such, the architectures of FIGS. 2C-2D may consume less resources (e.g., less processing resources, less battery power, etc.) than the architecture of FIG. 2E.

Figure 2F:
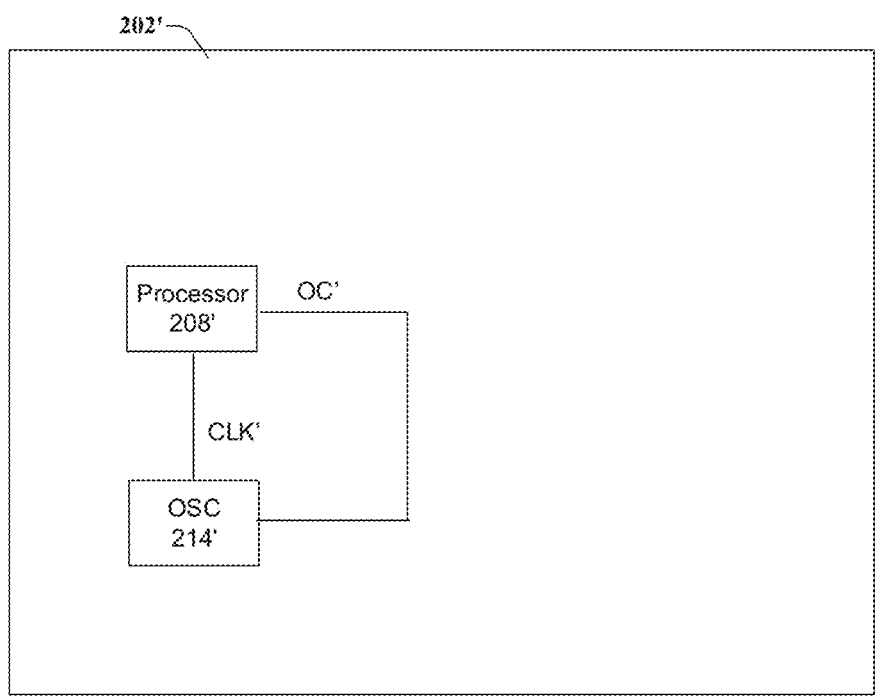
FIG. 2F is a block diagram illustrating a selection/adjustment of a clock signal in accordance with various aspects described herein.

Having just described various techniques for selecting or adjusting a frequency or frequency band of operation for reducing or avoiding interference, in some embodiments application requirements (or other requirements) may dictate the use of a particular frequency or frequency band. In such embodiments, a selection or adjustment in terms of the CLK' signal frequency may represent an alternative solution for reducing or avoiding interference. For example, FIG. 2F illustrates an embodiment wherein the processor 208' provides an oscillator control (OC') signal to the oscillator OSC 214'. The oscillator control OC' may serve to establish a particular frequency (within a range of frequencies) of the CLK' signal. Thus, an adjustment/modification in terms of the oscillator control OC' may provide for an adjustment/modification in terms of the frequency of the CLK' signal.

Figure 2G:
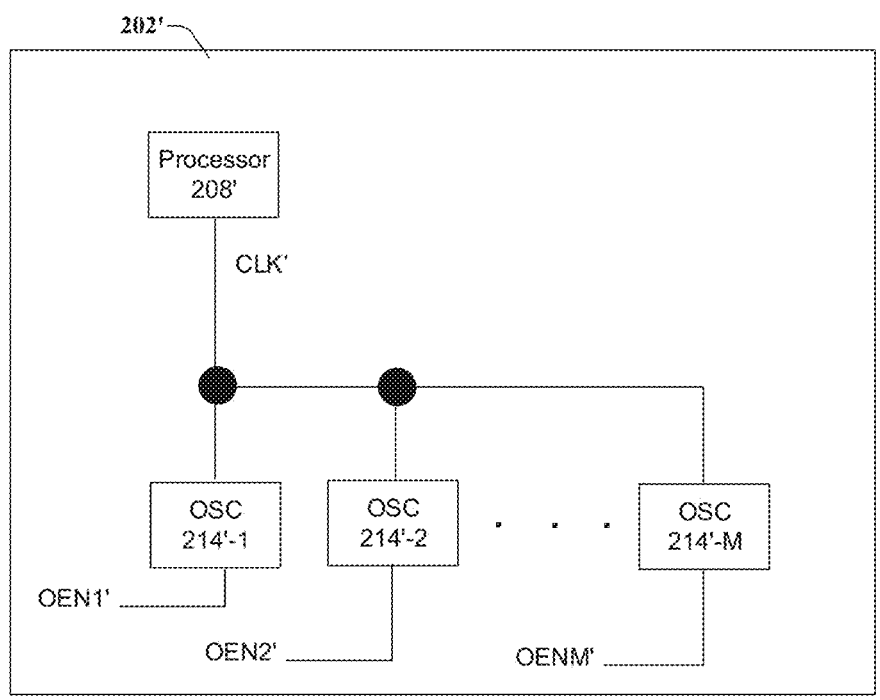
FIG. 2G is a block diagram illustrating a device that incorporates a plurality of oscillators that are selectively enabled in accordance with various aspects described herein.
Figure 2H:
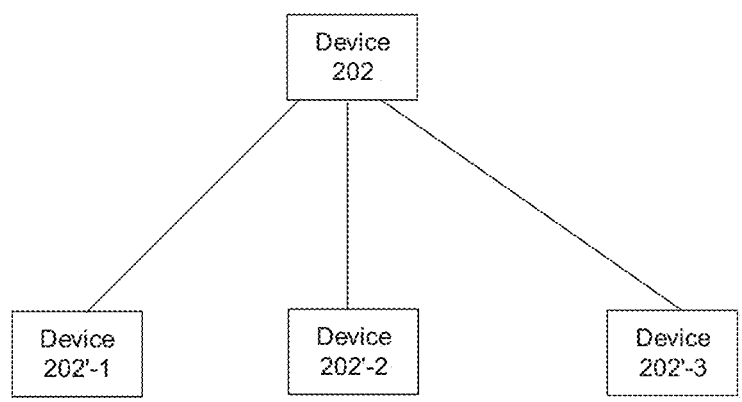
FIG. 2H is a block diagram illustrating a system incorporating a plurality of devices in accordance with various aspects described herein.

FIG. 2G illustrates another embodiment that may be used to select or adjust a CLK' signal that is provided to the processor 208'. For example, and referring to FIG. 2A and FIG. 2G, the oscillator OSC 214' may include a plurality of oscillators, such as for example OSC 214'-1, OSC 214'-2 . . . OSC 214'-M (where M represents the number of oscillators that are included). The outputs of the OSCs 214'-1 through 214'-M may be connected together via, e.g., a bus architecture in providing the CLK' signal to the processor 208'. The OSCs 214'-1 through 214'-M may each receive a respective enable signal (e.g., OEN1', OEN2' . . . OENM') from the processor 208'. When a given enable signal is asserted, the enable signal may enable or power-on the respective OSC. Conversely, when a given enable signal is not asserted, the enable signal may disable or power-down the respective OSC.

While the device 202 was described above as transmitting information (e.g., information 204), and the device 202' was described as receiving information (e.g., information 204'), one skilled in the art will appreciate that the devices 202 and 202' may each transmit and receive signals/information in a given embodiment. In this respect, one or more of the components described above in conjunction with the device 202 may be replicated in the device 202'. Similarly, one or more of the components described above in conjunction with the device 202' may be replicated in the device 202.

Figure 2I:
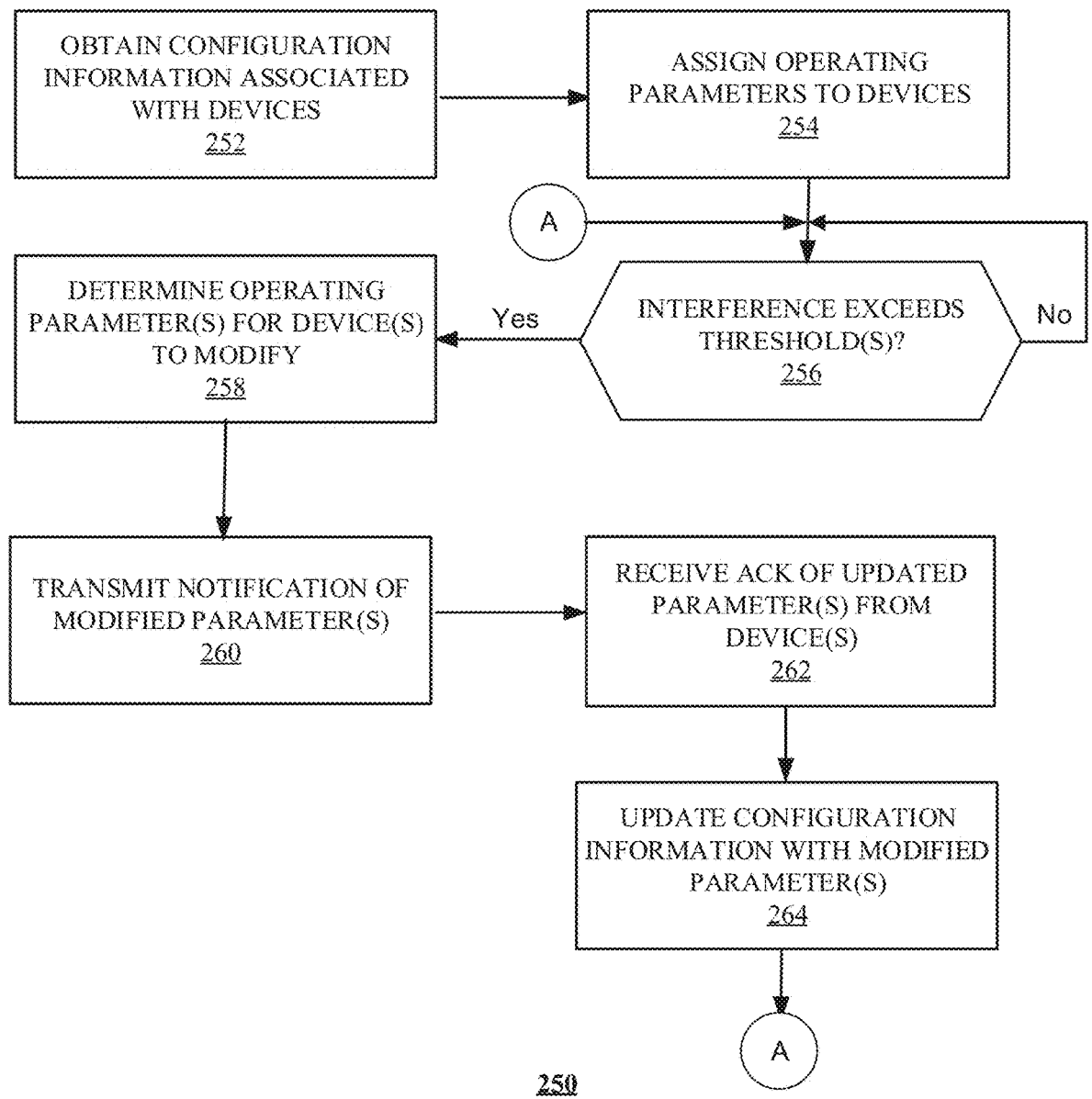
FIGS. 2I-2K depict illustrative embodiments of methods in accordance with various aspects described herein.

Furthermore, while described above in conjunction with a single device (e.g., device 202) communicating with another device (e.g., device 202'), embodiments of the disclosure may involve communication between multiple devices as represented in FIG. 1. Stated slightly differently, in a given embodiment there may be multiple devices 202 and/or multiple devices 202'. FIG. 2I1 illustrates an example of such an embodiment, wherein a device 202 is communicatively coupled to devices 202'-1, 202'-2 and 202'-3.

Referring to FIG. 2I1, one or more of the devices (e.g., the device 202) may be configured to select or modify a parameter associated with the operation of one or more of the other devices (e.g., one or more of the devices 202'-1 through 202'-3). For example, the device 202 may be configured to select an operating frequency (or frequency band) associated with one or more of the devices 202'-1 through 202'-3. The device 202 may be configured to select a clock signal parameter (e.g., a clock signal frequency) associated with one or more of the devices 202'-1 through 202'-3.

The selection or modification of a parameter (e.g., frequency, frequency band, clock signal frequency, clock signal frequency range, etc.) of a device may be permitted/authorized based on an authentication or validation scheme. For example, if the device 202 requests or commands a modification of the clock signal frequency of the device 202'-1, the device 202 may be required to provide a credential (e.g., a password) to the device 202'-1 before the device 202'-1 will accommodate/execute upon the request/command. In some embodiments, the device 202'-1 may be registered with the device 202 (potentially as part of a subscriber plan or the like), such that the device 202'-1 may trust requests/commands that originate from the device 202. The registration may include an identification of a make, model, and/or serial number associated with the device 202'-1 in order to uniquely identify the device 202'-1. By providing for authentication/validation, operating device parameters might only be modified based on requests/commands received from trusted devices.

In some embodiments, the device 202 may store (or otherwise obtain access to) a listing of configuration parameters associated with each of the devices 202'-1 through 202'-3. The configuration parameters included in the listing may include an identification of potential frequencies or frequency bands over which a respective device may operate, a clock frequency (or one or more ranges of clock frequencies) that a respective device may utilize, etc. In this manner, the device 202 may select operating parameters for each of the devices 202'-1 through 202'-3 to avoid causing (intra-device) interference in a given device (e.g., the device 202'-1) in terms of a frequency or frequency band of communication used by the device relative to a clock signal frequency used by the device.

The selection of the operating parameters by, e.g., the device 202 may be provided to reduce or avoid (inter-device) interference between, e.g., the devices 202'-1 through 202'-3. For example, the device 202 may command the device 202'-1 to operate in a first frequency band and the device 202'-2 to operate in a second frequency band that is different from the first frequency band.

In accordance with the above, operating parameters may be selected to optimize (e.g., reduce) an amount of interference (e.g., intra-device interference and/or inter-device interference) that is present in a given system. The interference reduction may be based on network traffic conditions, noise levels, etc., potentially in comparison to one or more thresholds. In some embodiments, a first device (e.g., the device 202'-1) may be given priority relative to a second device (e.g., the device 202'-2) in terms of interference reduction or avoidance. Such priority may be based on one or more factors or considerations, such as for example a subscription associated with the device 202'-1 that ensures the device 202'-1 a relatively high-level of quality of service (QoS), an application/service that the device 202'-1 is executing/providing (if, for example, the device 202'-1 is an Internet of Things (IoT) device that is operating to treat a life-threatening medical condition associated with a user), etc.

In some embodiments, interference reduction/avoidance techniques may take into consideration a number of clock sources that may be present. For example, in a multi-core architecture there may be multiple clock sources (e.g., a digitial signal processor clock, a graphics processor clock, an application core processor clock, etc.). If, for example, the graphics processor is known to operate most efficiently at a given clock frequency X, and a device (e.g., the device 202'1) is heavily utilizing the graphics processor (in terms of instructions executed/unit time, in terms of a time duration of use, etc.), a communication link associated with the device may be adjusted to avoid impacting the operatio of the graphics processor at clock frequency X.

Operating parameters associated with a device may be changed dynamically responsive to one or more operating conditions. For example, the introduction of new devices to a communication network may cause a reassignment of an operating parameter associated with a device that is already present/operating in the network. Such a reassignment may occur in real-time or substantially in real-time. Alternatively, the reassignment may be scheduled for a future date and/or time in order to avoid impacting the performance or operation of one or more devices in the near term. For example, scheduling reassignments can help to avoid a conflict for a given resource (e.g., a given frequency band) by updating more than one device (substantially) simultaneously.

FIG. 2I depicts an illustrative embodiment of a method 250 in accordance with various aspects described herein. The method 250 may be executed by one or more devices and/or components described herein, such as for example a network element. In some embodiments, the method 250 may be executed by a base station or access point 122—see FIG. 1.

In block 252, configuration information associated with one or more devices may be obtained. The configuration information may include an identification of one or more device capabilities and/or candidate operating parameters (e.g., frequency bands, clock frequencies, etc.).

In block 254, operating parameters may be assigned to the devices. For example, in block 254 each of the devices may be commanded to use a particular frequency band for communication or use a particular clock signal frequency.

The blocks 252 and 254 may represent an initialization procedure that may be executed the first time a device enters a network. Alternatively, the blocks 252 and/or 254 may be executed periodically and/or in accordance with a schedule.

In block 256, a determination may be made whether interference exceeds one or more thresholds. The determination in block 256 may be based on a specification of interference in one or more terms. For example, the interference in block 256 may be measured system/network wide and an average interference level may be determined. The interference may be assessed based on a group of devices or may be measured on a per device basis. In some embodiments, block 256 may include, e.g., a network element, a base station or an access point receiving an indication of an interference level based on one or more measurements.

If in block 256 it is determined that the interference does not exceed the threshold(s), flow may continue to reside at block 256 to continue to monitor interference levels. On the other hand, if in block 256 it is determined that the interference exceeds the threshold(s), flow may proceed from block 256 to block 258.

In block 258, a determination may be made regarding one or more operating parameters to modify for one or more device(s). For example, a frequency band used by a device for communicating and/or a clock signal frequency associated with the device may be selected for modification in block 258. The parameter(s) to modify may be based on one or more requirements or specifications (e.g., a QoS requirement) and may be selected based on the configuration information that is obtained in block 252.

In block 260, a notification of modified parameters may be transmitted to the device(s). The notification may take the form of a message, wherein a header of the message may uniquely identify a particular device that is the target/intended recipient of the message. To the extent that an authentication/validation technique is utilized as described above, the message may include a credential that identifies the transmitting device (e.g., the network element, base station or access point) and/or the recipient device. The message may indicate that the operating parameters are to be modified by the recipient immediately, at a particular date and/or time, in accordance with a schedule, upon the occurrence of an event (e.g., receipt of an additional message), etc.

In block 262, an acknowledgment of modified parameters may be received from the device(s). In some embodiments, the acknowledgment may include an identification of a parameter value (e.g., a clock signal frequency) that was incorporated by a device based on the message received by the device in connection with block 260.

In block 264, the configuration information associated with block 252 may be updated to reflect any device parameters that were modified in conjunction with blocks 258-262. Flow may proceed from block 264 to block 256 to monitor the interference in accordance with the modified device parameters.

Figure 2J:
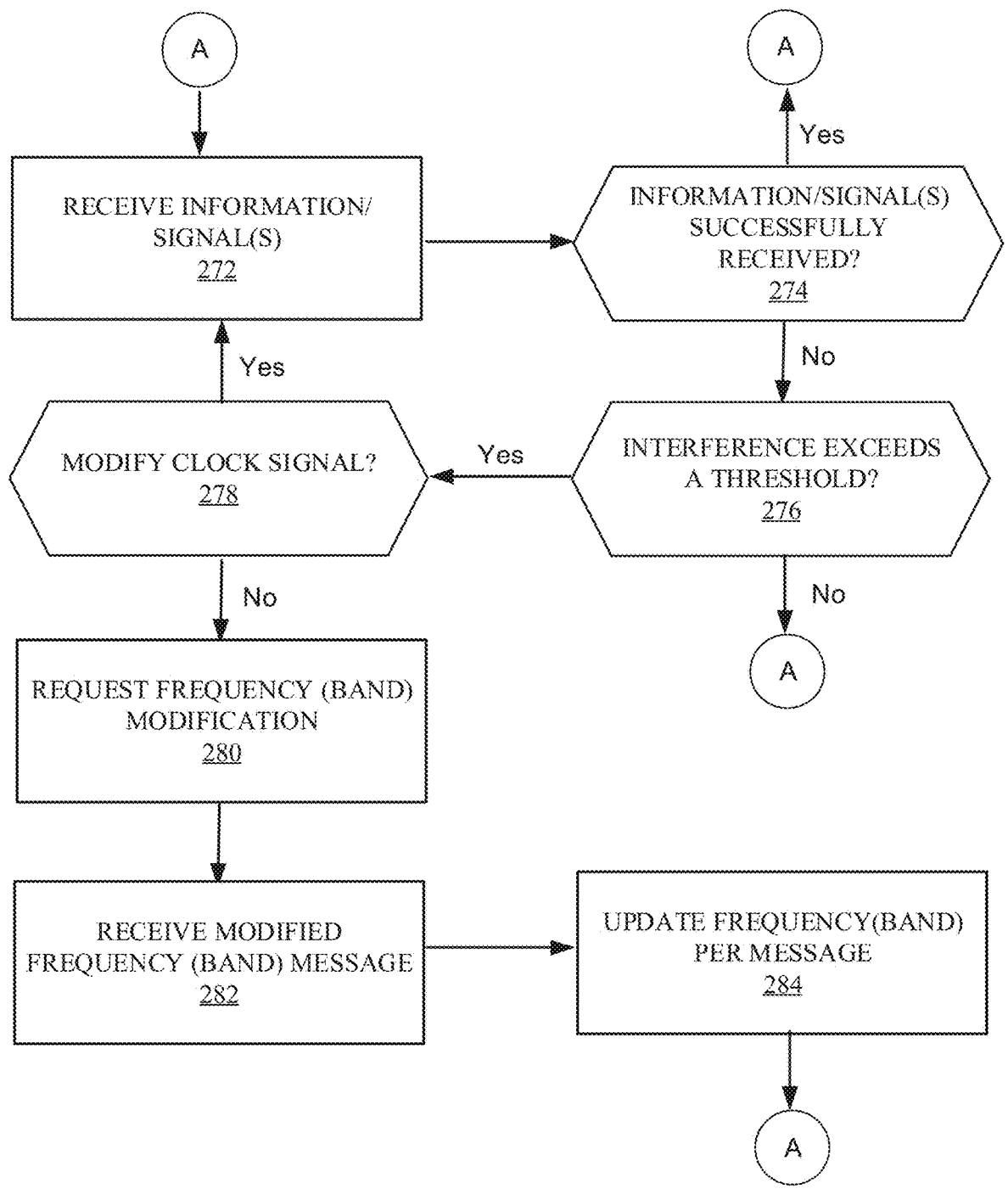

FIG. 2J depicts an illustrative embodiment of a method 270 in accordance with various aspects described herein. The method 270 may be executed by one or more devices and/or components described herein. For the sake of ease in explanation, the blocks of the method 270 are described below in conjunction with a user equipment executing the method 270. In some embodiments, the method 270 may be executed by, e.g., an access terminal 112, a data terminal 114, a mobile device 124, a vehicle 126, a media terminal 142, or a display device 144—see FIG. 1.

In block 272, information/signals may be received. For example, the information/signals may be received as part of a downlink of a communication system.

In block 274, a determination may be made whether the information/signals of block 272 were successfully received. For example, in block 274 one or more integrity verifications (e.g., a computation of a checksum, a cyclic redundancy code, etc.) may be performed/examined to determine whether the information/signals were successfully received. In some embodiments, successful receipt may be based on determining that an energy level associated with the information/signals is greater than a first threshold and less than a second threshold.

If the information/signals were successfully received in block 274, flow may proceed from block 274 to block 272 to continue receiving information/signals as appropriate. Otherwise, if the information/signals are not successfully received in block 274, flow may proceed from block 274 to block 276. As part of the flow from block 274, a record of the failure may be logged.

In block 276, a determination may be made whether interference exceeds a threshold. For example, if the number of failures recorded in conjunction with block 274 exceeds a threshold (potentially as a function of time), a determination may be made that the interference exceeds a threshold.

If in block 276 it is determined that the interference does not exceed the threshold, flow may proceed from block 276 to block 272. Otherwise, if the interference is determined to exceed the threshold in block 276, flow may proceed from block 276 to block 278.

In block 278, a determination may be made if a local adjustment/modification can be made in an effort to reduce, or even completely avoid/eliminate, the interference. For example, if more than one clock signal frequency (or more than one range of clock signal frequencies) is/are supported by the user equipment, the user equipment may modify the clock signal frequency (or range of clock signal frequencies) that the user equipment is using and flow may proceed from block 278 to block 272. Otherwise, if a modification of the clock signal is not possible, flow may proceed from block 278 to block 280.

As part of the flow from block 278 to block 272, the user equipment may transmit a notification of an updated clock signal (in terms of frequency or range of frequencies used).

In block 280, the user equipment may transmit a request to operate at a different frequency (or different frequency band) in an effort to reduce or eliminate the interference. For example, the user equipment may transmit the request to a network element (or other device) in block 280. The request may include an indication of the frequency or frequency band at which the user equipment is currently operating.

In block 282, the user equipment may receive a message that indicates a modified frequency (or frequency band) that the user equipment should use.

Responsive to the receipt of the message in block 282, the user equipment may update the frequency or frequency band at which it operates in block 284. For example, in block 284 the user equipment may use the frequency or frequency band specified in the message of block 282.

Figure 2K:
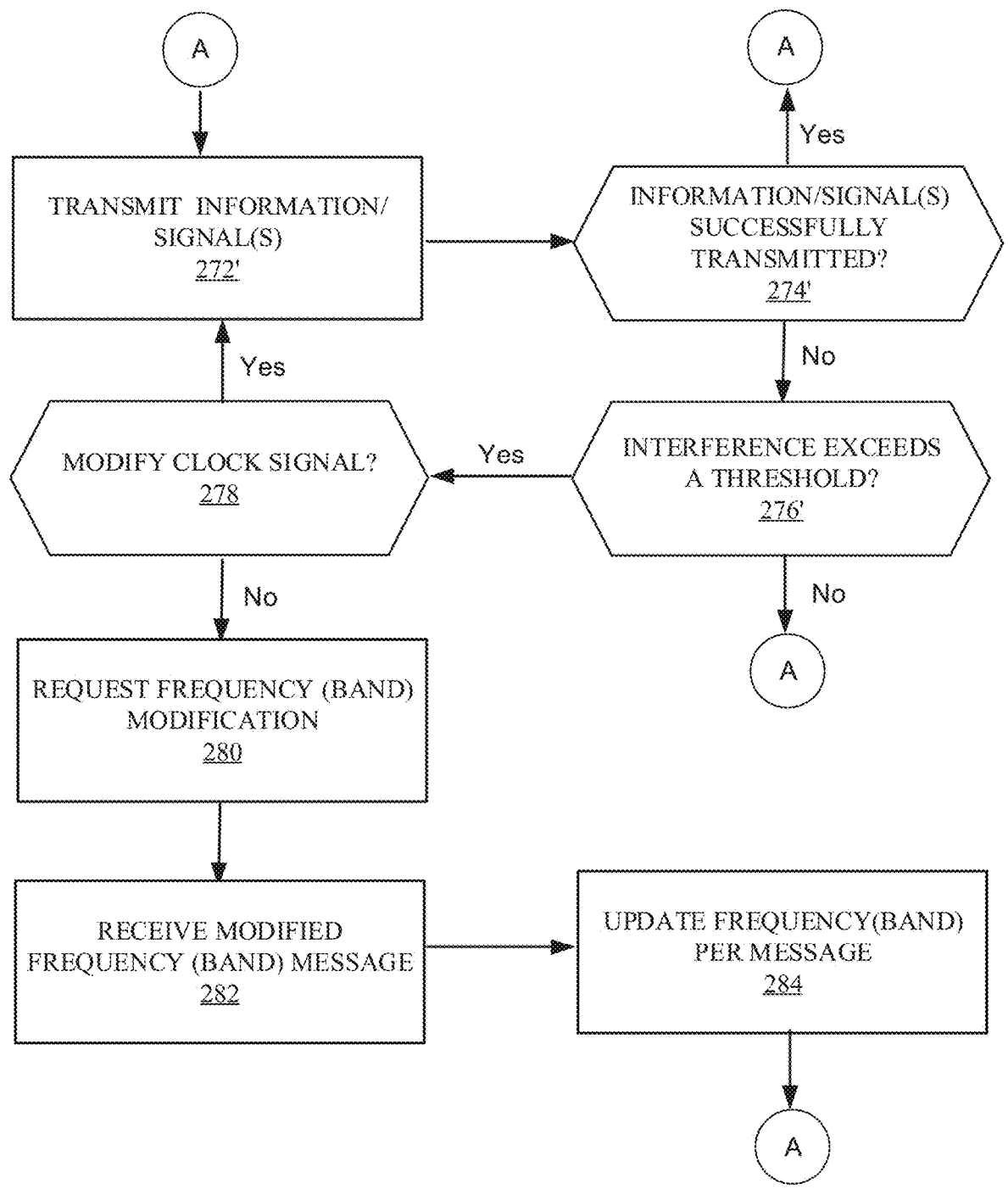

While the method 270 is described above in conjunction with a receipt of information/signals on a downlink, the method may be updated to accommodate a transmission of information/signals on an uplink. For example, FIG. 2K illustrates a method 270' wherein the user equipment transmits information/signals in block 272' and determines whether the information/signals were successfully transmitted in block 274'.

The determination of block 274' may be based on a receipt of an acknowledgment in response to the transmission of block 272'. If an acknowledgment is received, flow may proceed from block 274' to block 272'. On the other hand, if the acknowledgement is not received as part of block 274', flow may proceed from block 274' to block 276' and a record of the failed acknowledgment may be recorded. The determination of block 274' may be based on determining that an energy level associated with the information/signals is greater than a first threshold and less than a second threshold; the user equipment may receive a status message as part of block 274' indicating whether the transmitted information/signals comply with such thresholds.

In block 276', a determination may be made whether interference exceeds a threshold. For example, if the number of failures recorded in conjunction with block 274' exceeds a threshold (potentially as a function of time), a determination may be made that the interference exceeds a threshold.

If in block 276' it is determined that the interference does not exceed the threshold, flow may proceed from block 276' to block 272'. Otherwise, if the interference is determined to exceed a threshold in block 276', flow may proceed from block 276' to block 278.

The execution of blocks 278-284 in FIG. 2K may be substantially similar to that described above in connection with FIG. 2J. As such, a re-description of those blocks is omitted herein for the sake of brevity.

While for purposes of simplicity of explanation, the respective processes are shown and described as a series of blocks in FIGS. 2I-2K, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. Additional blocks not shown may be included in some embodiments. While described as separate methods for the sake of ease in explanation, aspects of the methods 250, 270, and 270' may be combined with one another in some embodiments.

As described herein, aspects of this disclosure may be used to reduce or avoid interference. The interference reduction/avoidance techniques described herein may take into consideration fundamental/operating frequencies as well as any harmonics or sub-harmonics thereof.

Aspects of this disclosure may be implemented at one or more layers of an application or application program interface (API). Aspects of the disclosure may be implemented at a radio interface layer (RIL). Aspects of the disclosure may be implemented in conjunction with one or more protocols, such as for example a radio resource control (RRC) protocol.

In some embodiments, interference reduction/avoidance techniques described herein may take into consideration a tolerance of a communication channel bandwidth. Accommodations may be made for filter (e.g., filter 220' of FIG. 2E) roll-off and/or jitter/tolerance of an oscillator (e.g., oscillator 214' of FIG. 2A).

Aspects of the disclosure may measure or determine whether interference is present (and if so, to what extent/degree) in one or more domains. For example, measurements may be taken in an analog domain, a digital domain, etc. One or more transformations (e.g., a Fourier transform) may be imposed on one or more signals to assist in the determination/calculation.

Aspects of the disclosure may be applied to, or executed by, any number of devices or components. For example, aspects of the disclosure may be applied in connection with memory buses, digital signal processors (DSPs), graphics processors, and application processor (AP) cores. Aspect of the disclosure may be applied in connection with smartphones, smart televisions (TVs), automobiles, Internet of Things (IoT) capable devices, etc.

Figure 3:
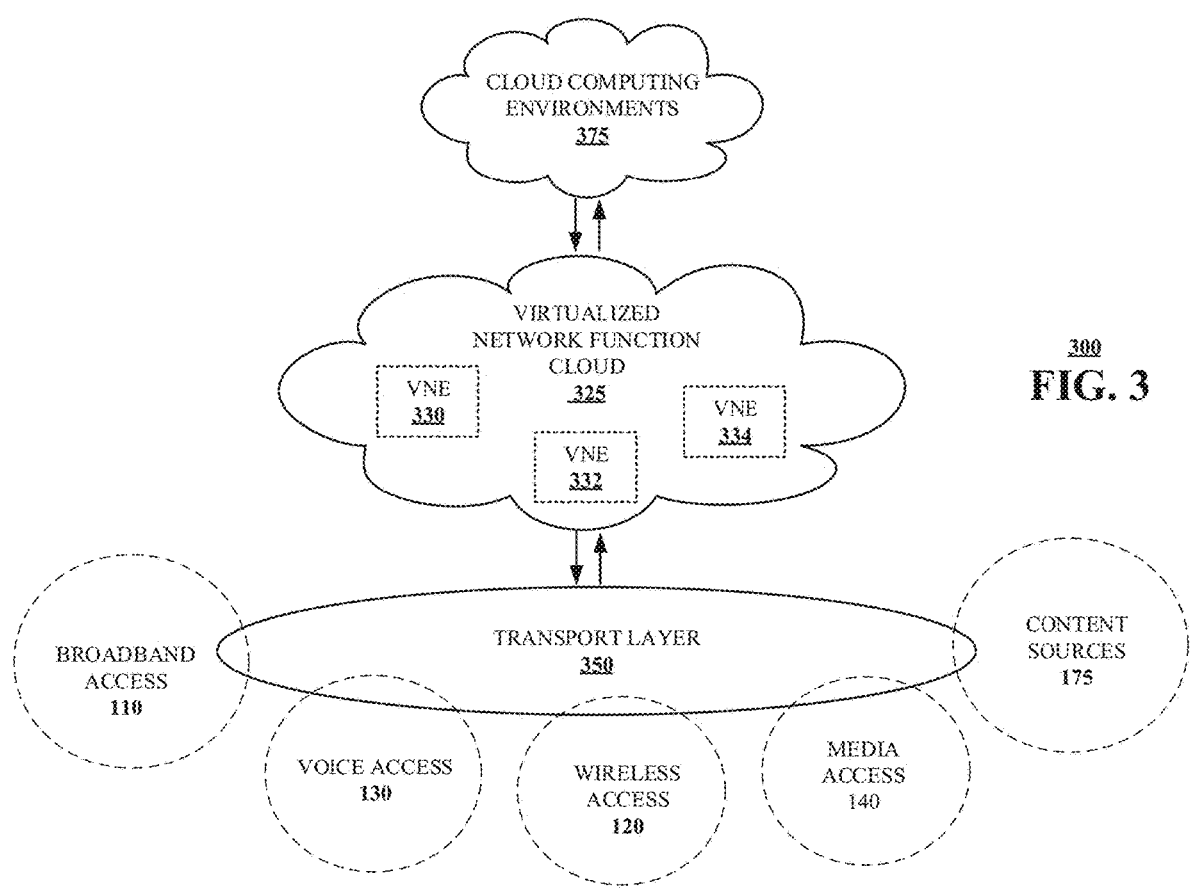
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200, and/or the methods 250, 270, or 270' presented in FIG. 1 and FIGS. 2A-2K.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a virtual network element 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as virtual network elements 330, 332 or 334. These network elements can be included in transport layer 350.

The virtualized network function cloud 325 interfaces with the transport layer 350 to provide the virtual network elements 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, virtualized network elements 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNE 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
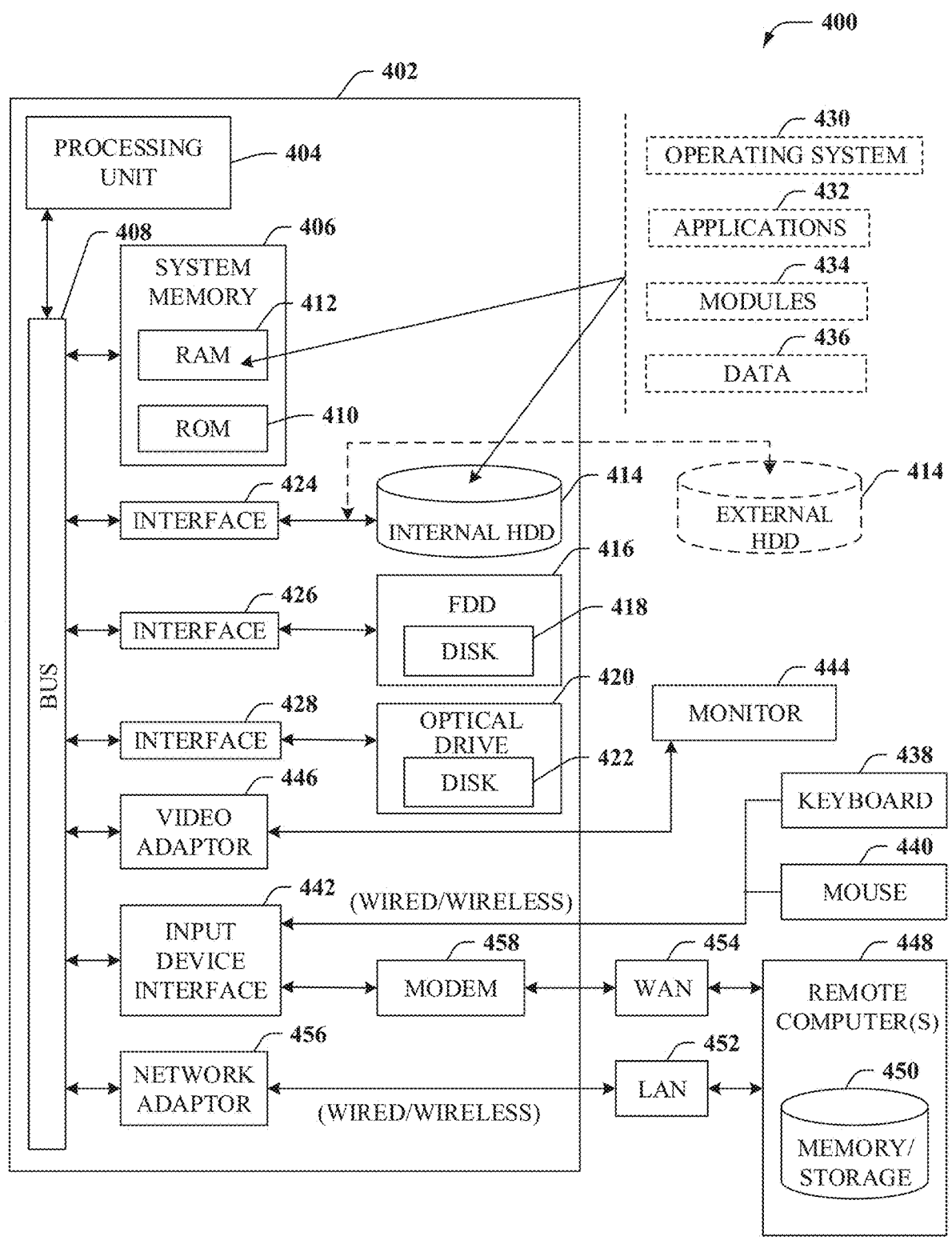
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or virtual network elements 330, 332, 334, etc. Each of these devices can be implemented via computer-executable instructions that can run on one or more computers, and/or in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal hard disk drive 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The hard disk drive 414, magnetic disk drive 416 and optical disk drive 420 can be connected to the system bus 408 by a hard disk drive interface 424, a magnetic disk drive interface 426 and an optical drive interface 428, respectively. The interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the local network 452 through a wired and/or wireless communication network interface or adapter 456. The adapter 456 can facilitate wired or wireless communication to the LAN 452, which can also comprise a wireless AP disposed thereon for communicating with the wireless adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
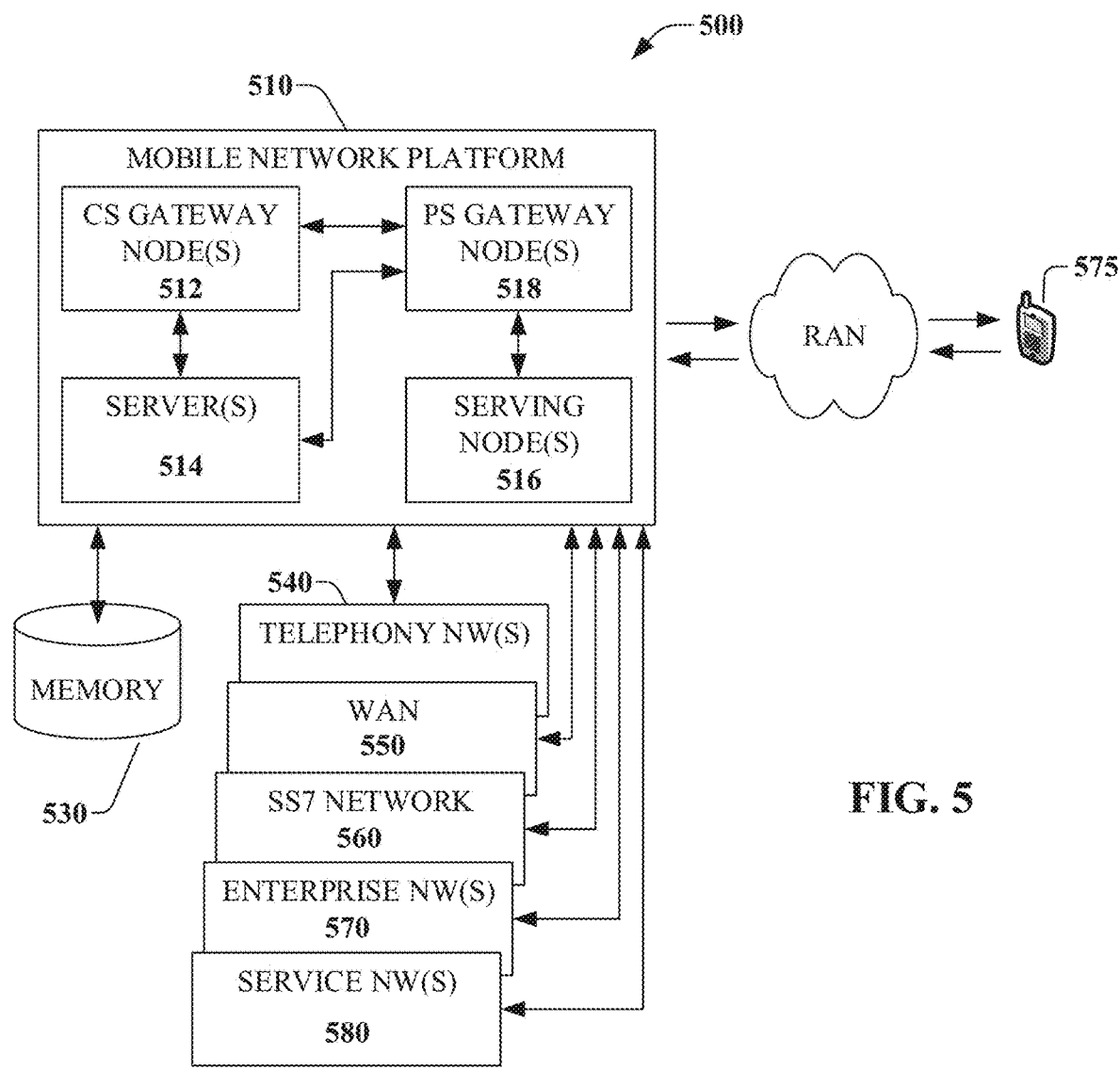
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or virtual network elements 330, 332, 334, etc. In one or more embodiments, the mobile network platform 510 can generate and receive signals transmitted and received by base stations or access points such as base station or access point 122. Generally, wireless network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 570. Circuit switched gateway node(s) 512 can authorize and authenticate traffic (e.g., voice) arising from such networks. Additionally, CS gateway node(s) 512 can access mobility, or roaming, data generated through SS7 network 570; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the wireless network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 560 can embody, at least in part, a service network(s) like IP multimedia subsystem (IMS). Based on radio technology layer(s) available in technology resource(s) 517, packet-switched gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, wireless network platform 510 also comprises serving node(s) 516 that, based upon available radio technology layer(s) within technology resource(s) 517, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in wireless network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to wireless network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of macro wireless network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of wireless network platform 510. Other operational information can comprise provisioning information of mobile devices served through wireless platform network 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, enterprise network(s) 570, or SS7 network 560. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
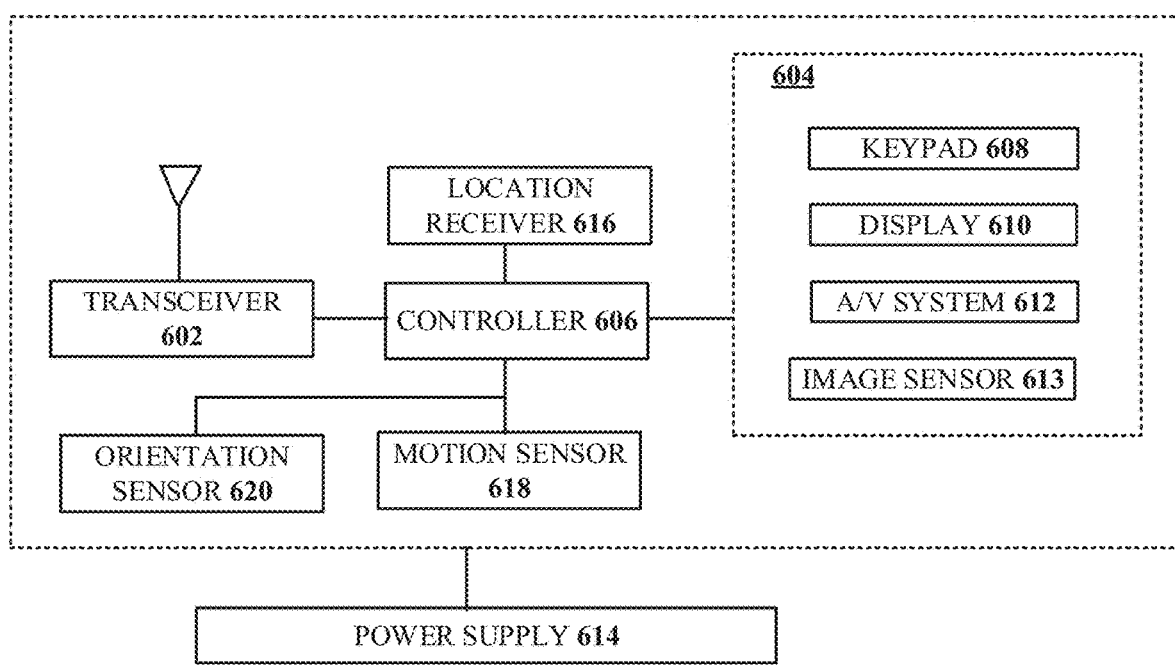
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetoothx and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAIVI), and direct Rambus RAM (DRRAIVI). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
    a processing system including a processor; and
    a memory that stores executable instructions that, when executed by the processing system, facilitate performance of operations, the operations comprising:
        determining at least one operating parameter associated with a communication device to modify responsive to a determination that interference associated with a signal exceeds a threshold, wherein the at least one operating parameter includes a clock signal frequency range of a clock of the communication device; and
        transmitting a notification to the communication device, wherein the notification includes an indication of the at least one operating parameter;
    wherein the determining of the at least one operating parameter associated with the communication device to modify is based on a first priority level associated with the communication device relative to a second priority level associated with a second communication device, wherein the first priority level is different from the second priority level;
    wherein the deteriming of the at least one operating parameter associated with the to communicate with the communication device, a second fundamental frequency that the device uses to communicate with the second communication device, and a forth fundamental frequency that the second communication device uses to communicate with the device; and
    wherein the notification includes a first identification of the device and a second identification of the communication device, and wherein the notification includes a credential that authenticatse the processing system to the communication device.

2. The device of claim 1, wherein the communication device is a mobile device.

3. The device of claim 1, wherein the device is a mobile device.

4. The device of claim 1, wherein the signal is associated with a streaming video service.

5. The device of claim 1, wherein the at least one operating parameter includes a frequency band that the communication device uses to communicate.

6. The device of claim 1, wherein the determining of the at least one operating parameter associated with the communication device to modify is based on a first harmonic and a first sub-harmonic associated with the first fundamental frequency,
    wherein the determining of the at least one operating parameter associated with the communication device to modify is based on a second harmonic and a second sub-harmonic associated with the second fundamental frequency,
    wherein the determining of the at least one operating parameter associated with the communication device to modify is based on a third harmonic and a third sub-harmonic associated with the third fundamental frequency, and
    wherein the determining of the at least one operating parameter associated with the communication device to modify is based on a fourth harmonic and a fourth sub-harmonic associated with the fourth fundamental frequency.

7. The device of claim 1, wherein the operations further comprise:
    obtaining configuration information associated with a plurality of communication devices, wherein the plurality of communications devices includes the communication device and a second communication device, and wherein the determining of the at least one operating parameter to modify is based on a second operating parameter associated with the second communication device;
    receiving an acknowledgement from the communication device responsive to the transmitting of the notification; and updating the configuration information associated with the plurality of communication devices responsive to the receiving of the acknowledgment.

8. The device of claim 1, wherein the notification includes an identification of the communication device and at least one credential that authenticates the device.

9. The device of claim 1, wherein the signal corresponds to a downlink signal transmitted from the device to the communication device.

10. The device of claim 1, wherein the signal corresponds to an uplink signal received by the device from the communication device.

11. The device of claim 1, wherein the device includes a network element, a base station, an access point, or any combination thereof.

12. A non-transitory machine-readable medium, comprising executable instructions that, when executed by a processing system including a processor, facilitate performance of operations, the operations comprising:
   determining at least one operating parameter associated with a user equipment to modify responsive to a determination that interference associated with a signal exceeds a threshold, wherein the at least one operating parameter includes a clock signal frequency range of a clock of the user equipment; and
   transmitting a notification that includes an indication of the at least one operating parameter;
   wherein the determining of the at least one operating parameter associated with the user equipment to modify is based on a first priority leve associated with the user equipment relative to a second priority level associated with a second user equipment,
   wherein the first priority level is different from the second priority level;
   wherein the determining of the at least one operating parameter associated with the user equipment to modify is based on a first fundamental frequency that the processing system uses to communicate with the user equipment, a second fundamental frequency that the user equipment uses to communicate with the processing system, a third fundamental frequency that the processing system uses to communicate with the second user equipment, and a fourth fundamental frequency that the second user equipment uses to communicate with the processing system; and
   wherein the notifiction includes a first identification of the processing system and a second identification of the user equipment, and wherein the notification includes a credential that authenticates the processing system to the user equipment.

13. The non-transitory machine-readable medium of claim 12, wherein the transmitting of the notification comprises transmitting the notification to the user equipment.

14. The non-transitory machine-readable medium of claim 12, wherein the signal is transmitted to the user equipment in accordance with a first frequency band, and wherein the operations further comprise:
   transmitting a second signal to the user equipment in accordance with a second frequency band, wherein the second frequency band excludes all frequencies included in the first frequency band.

15. The non-transitory machine-readable medium of claim 12, wherein the signal is received from the user equipment in accordance with a first frequency band, and wherein the operations further comprise:
   receiving a second signal from the user equipment in accordance with a second frequency band, wherein the second frequency band excludes all frequencies included in the first frequency band.

16. The non-transitory machine-readable medium of claim 12, wherein the determining of the at least one operating parameter to modify is based on a network traffic condition of a network exceeding a second threshold, a noise level of the network exceeding a third threshold, an application that the user equipment is executing, and a quality of service specification associated with a communication service being provided via the user equiment.

17. The non-transitory machine-readable medium of claim 12, wherein the notification includes an identification of the user equipment and at least one credential that authenticates the processing system.

18. The non-transitory machine-readable medium of claim 12, wherein the signal corresponds to a downlink signal transmitted to the user equipment.

19. The non-transitory machine-readable medium of claim 12, wherein the signal corresponds to an uplink signal received from the user equipment.quipment.

20. A method, comprising:
   receiving, by a communication device including a processor, a notification of at least one operating parameter associated with the communication device to modify responsive to a determination that interference associated with a signal exceeds a threshold, wherein the at least one operating parameter includes a clock signal frequency range of a clock of the communication device; and
   responsive to the receiving of the notification, updating the at least one operating parameter at the communication device;
   wherein the at least one operating parameter associated with the communication device to modify is based on a first priority level associated with the communication device relative to a second priority level associated with a second communication device,
   wherein the first priority level is different from the second priority level,
   wherein the at least one operating parameter associated with the communication device to modify is based on a first fundamental frequency that a processing system uses to communicate with the communication device, a second fundamental frequency that the communication device uses to communicate with the processing system, a third fundamental frequency that the processing system uses to communicate with the second communication device, and a fourth fundamental frequency that the second communication device uses to communicate with the processing system,
   wherein the at least one operating parameter associated with the communication device to modify is based on a first harmonic and a first sub-harmonic associated with the first fundamental frequency,
   wherein the at least one operating parameter associated with the communication device to modify is based on a second harmonic and a second sub-harmonic associated with the second fundamental frequency,
   wherein the at least one operating parameter associated with the communication device to modify is based on a third harmonic and a third sub-harmonic associated with the third fundamental frequency,
   wherein the at least one operating parameter associated with the communication device to modify is based on a fourth harmonic and a fourth sub-harmonic associated with the fourth fundamental frequency, wherein the notification comprises a first identification of the processing system, a second identification of the communication device, and a credential that authenticates the processing system to the communication device.

* * * * *